Dec. 3, 1968  W. M. SCHWARTZ, JR., ET AL  3,413,741
ELECTRIC IRON
Filed Aug. 23, 1966  7 Sheets-Sheet 1
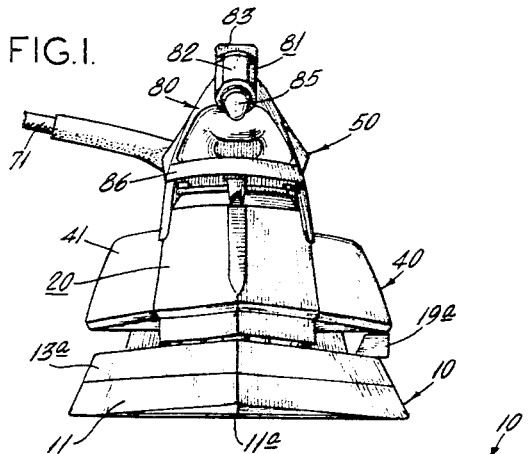
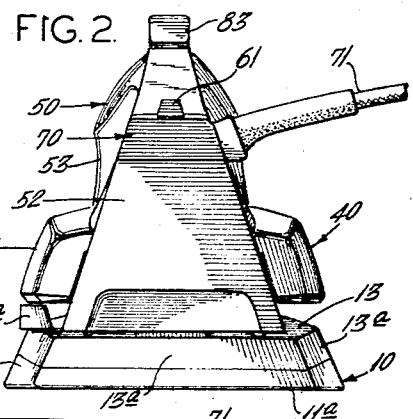
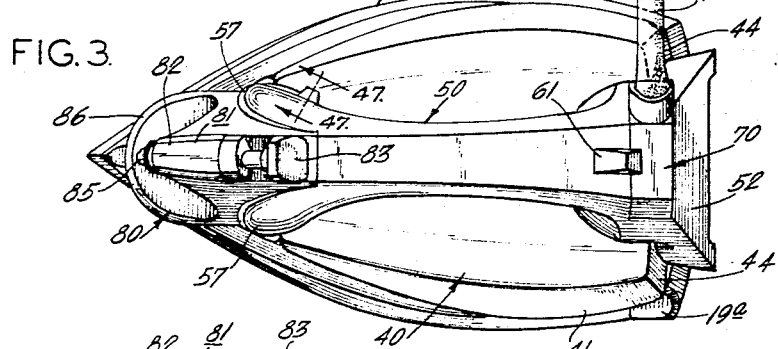
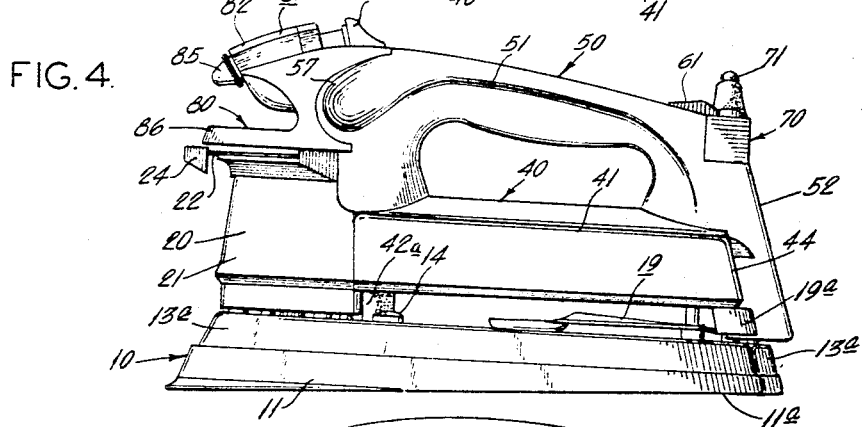
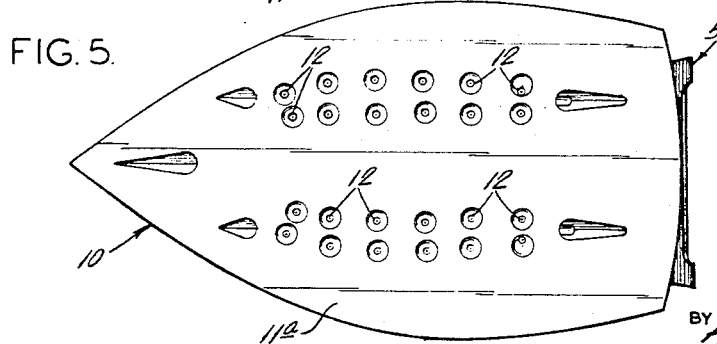
INVENTORS:
WALTER M. SCHWARTZ, JR.
CHARLES R. TURNER
JOHN C. FAGAN
BY *Howson & Howson*
ATTYS.

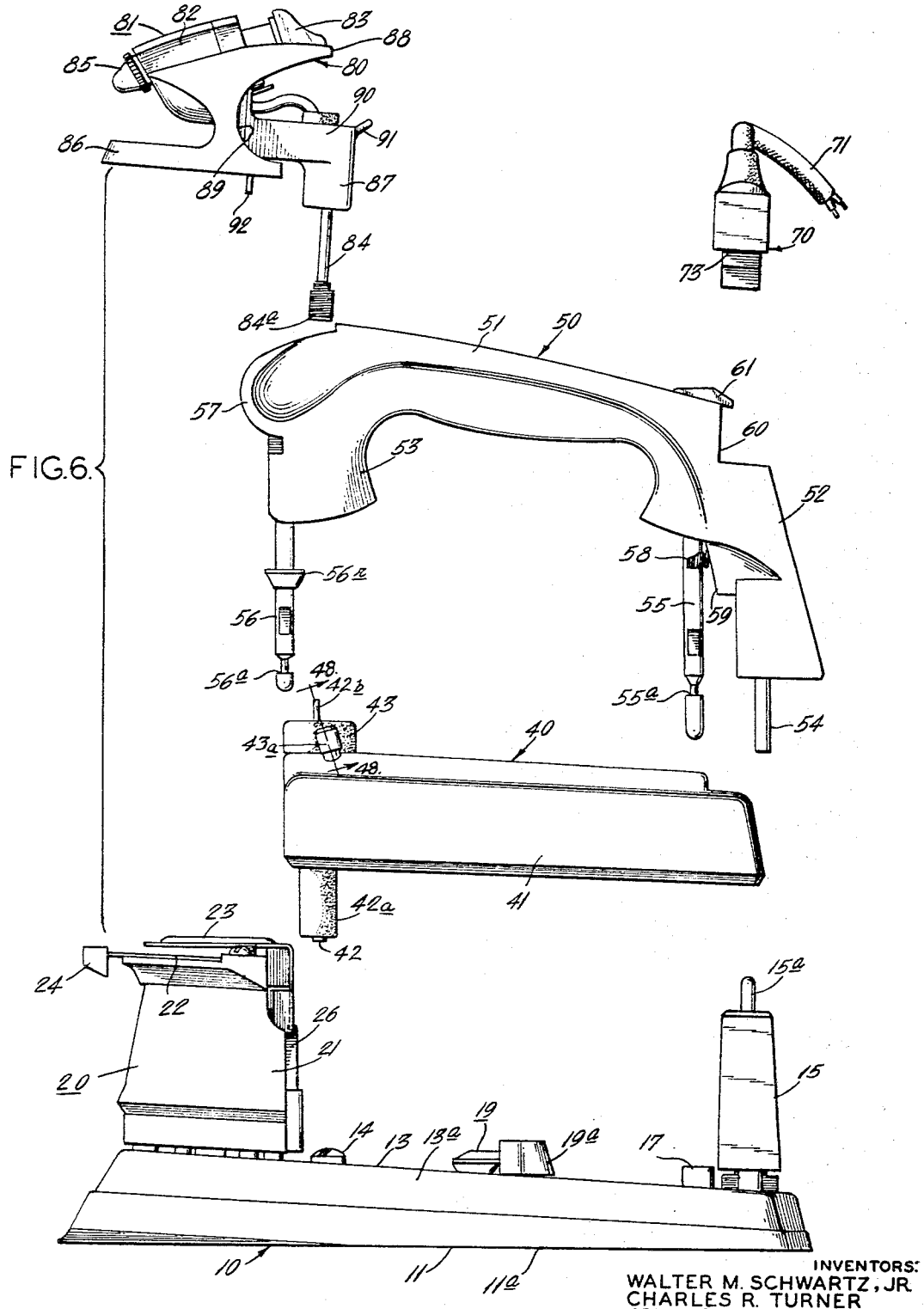

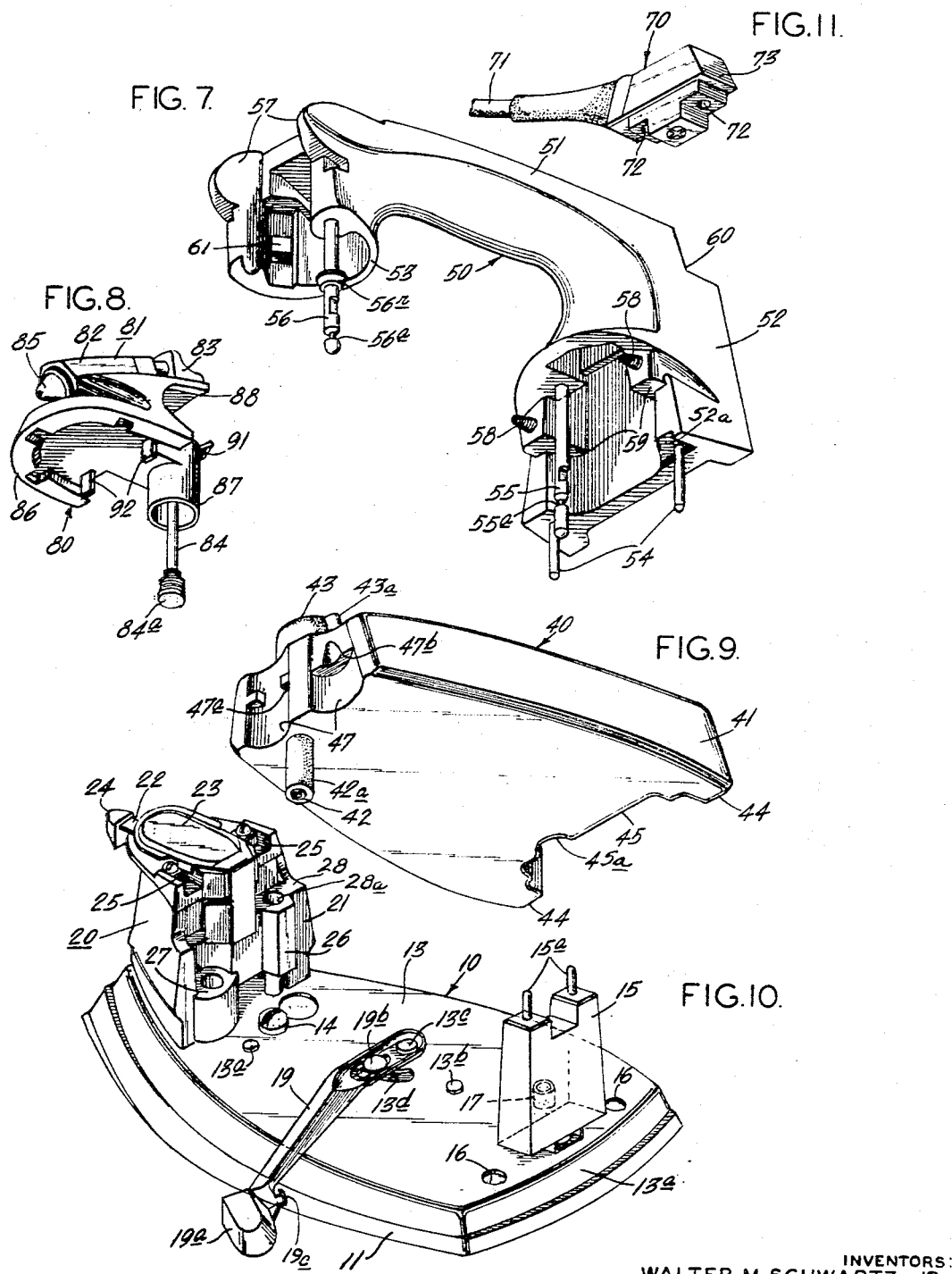

Dec. 3, 1968   W. M. SCHWARTZ, JR., ET AL   3,413,741
ELECTRIC IRON
Filed Aug. 23, 1966   7 Sheets-Sheet 4
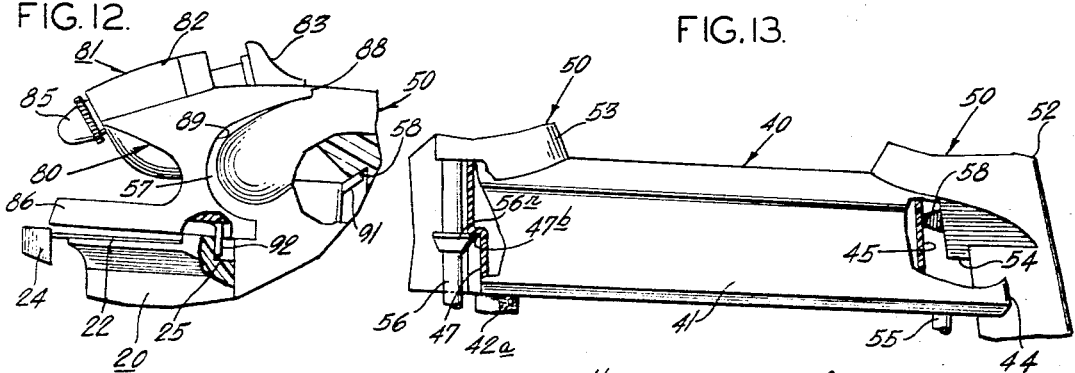
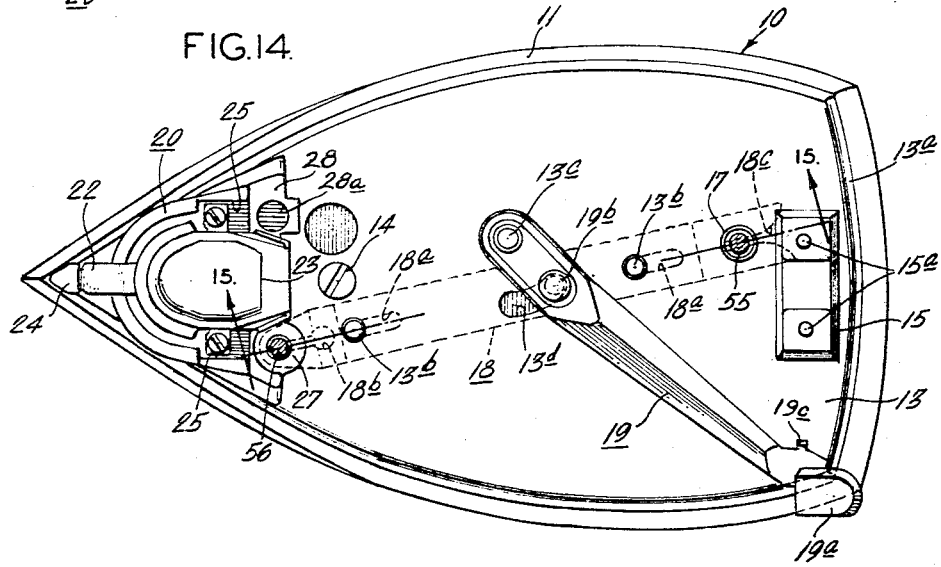
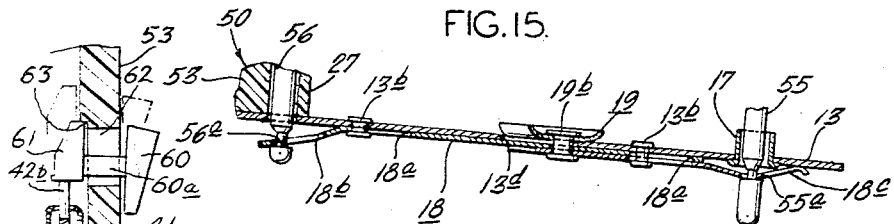
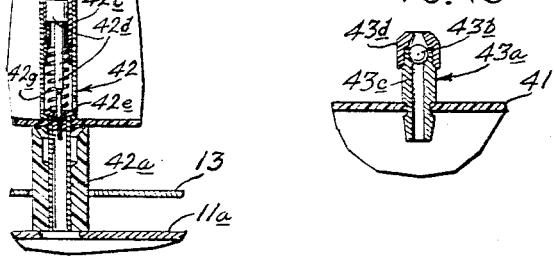
INVENTORS:
WALTER M. SCHWARTZ, JR.
CHARLES R. TURNER
JOHN C. FAGAN
BY Howson & Howson
ATTYS.

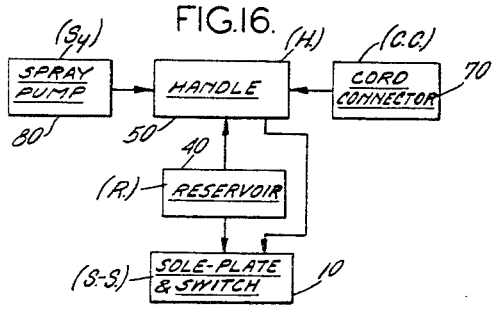
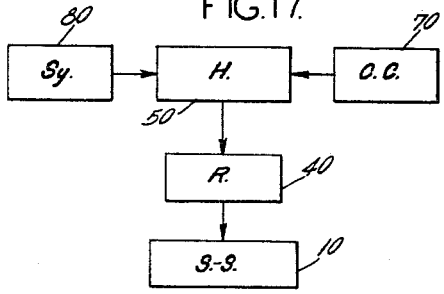
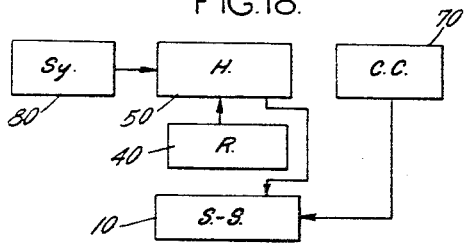
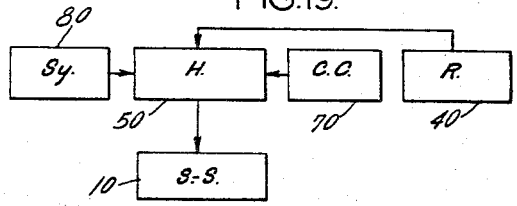
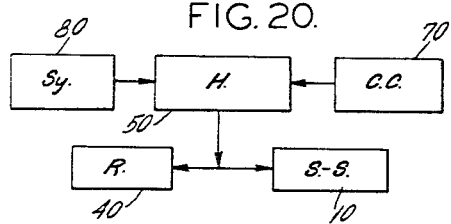
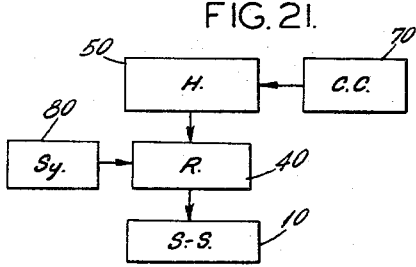
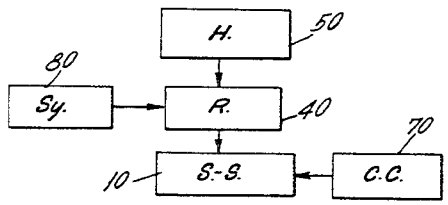
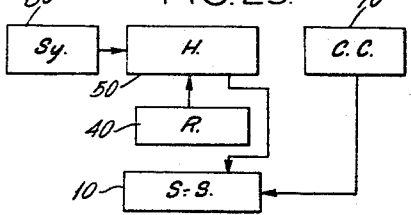
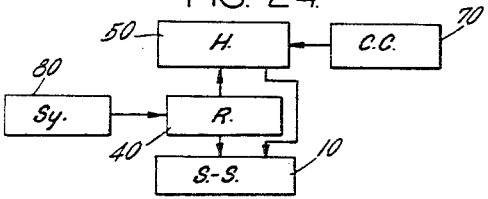
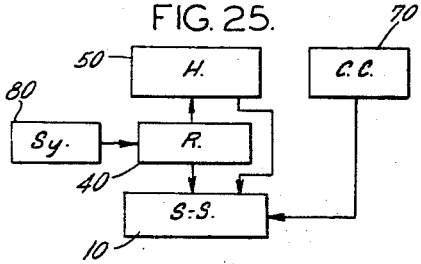
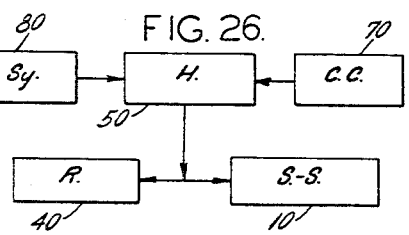

Dec. 3, 1968  W. M. SCHWARTZ, JR., ET AL  3,413,741
ELECTRIC IRON
Filed Aug. 23, 1966  7 Sheets-Sheet 6
FIG. 27.
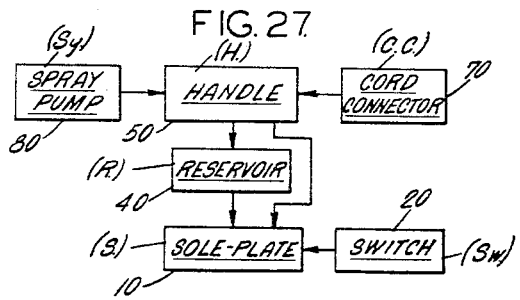
FIG. 28.
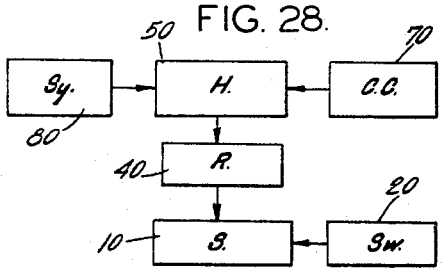
FIG. 29.
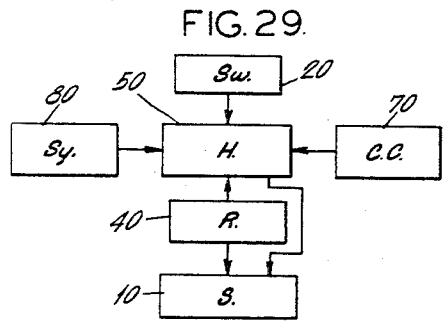
FIG. 30.
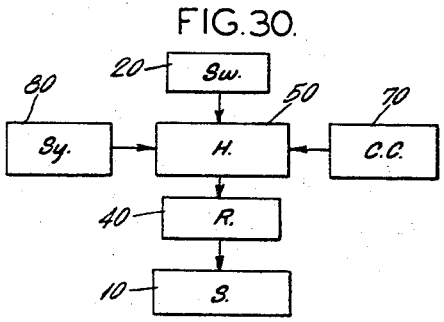
FIG. 31.
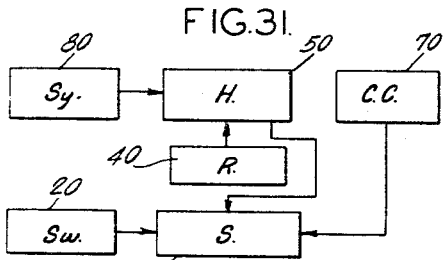
FIG. 32.
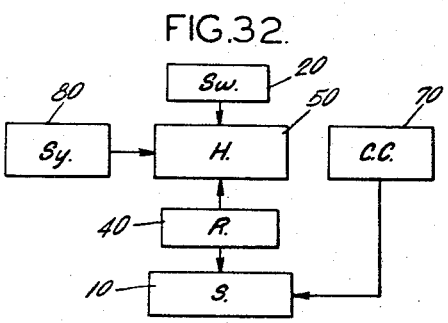
FIG. 33.
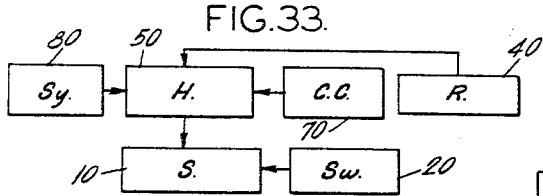
FIG. 34.
FIG. 36.
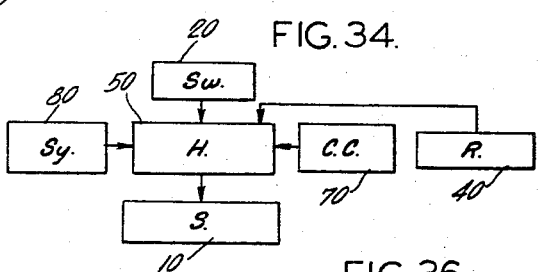
FIG. 35.
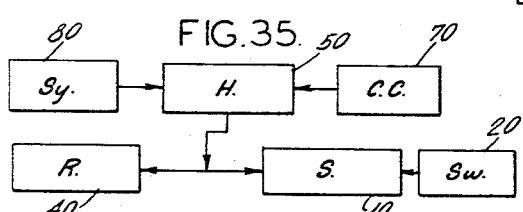
FIG. 37.
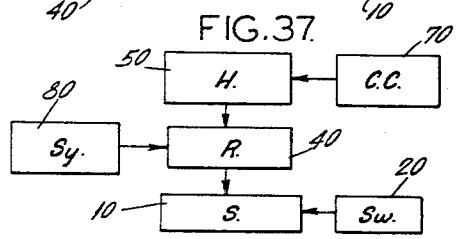
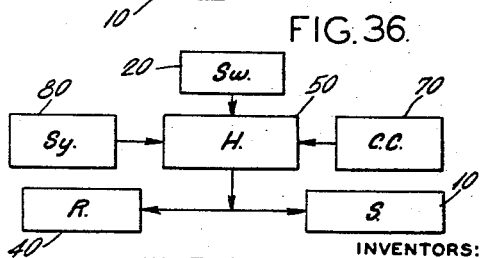
INVENTORS:
WALTER M. SCHWARTZ, JR.
CHARLES R. TURNER
JOHN C. FAGAN
BY Howson & Howson
ATTYS.

Dec. 3, 1968     W. M. SCHWARTZ, JR., ET AL     3,413,741
ELECTRIC IRON
Filed Aug. 23, 1966     7 Sheets-Sheet 7
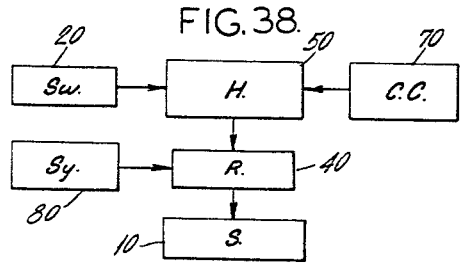
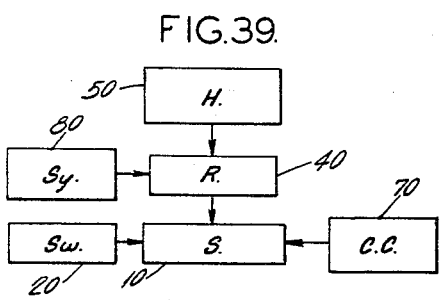
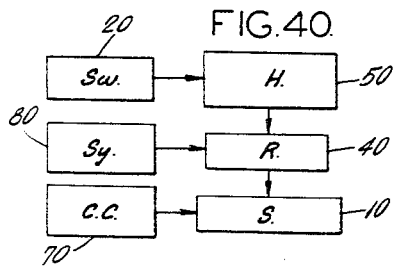
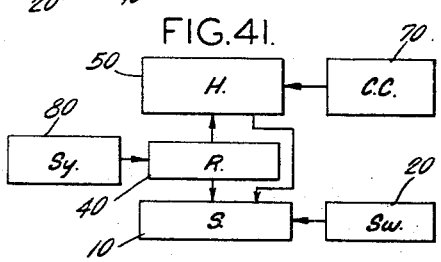
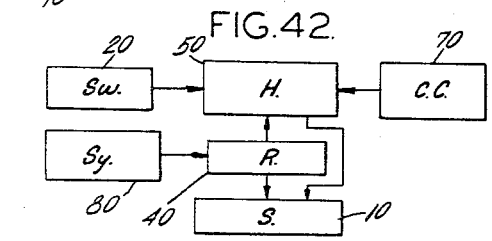
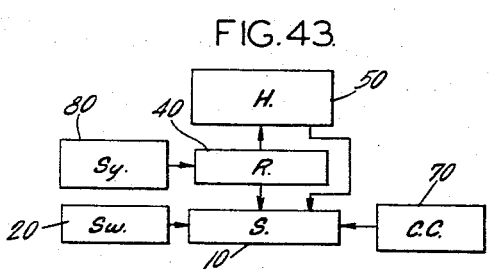
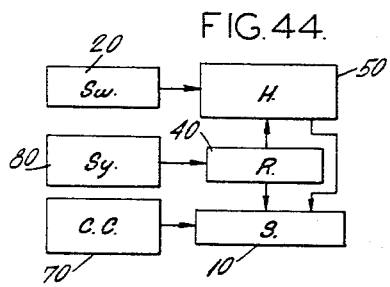
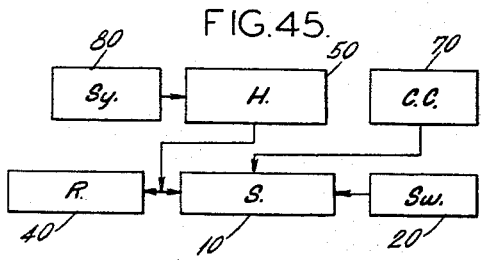
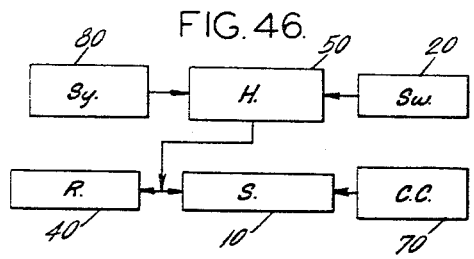
INVENTORS:
WALTER M. SCHWARTZ, JR.
CHARLES R. TURNER
JOHN C. FAGAN
BY *Howson & Howson*
ATTYS.

United States Patent Office

3,413,741
Patented Dec. 3, 1968

3,413,741
ELECTRIC IRON
Walter M. Schwartz, Jr., Charles R. Turner, and John C. Fagan, Philadelphia, Pa., assignors to Proctor-Silex Incorporated, Philadelphia, Pa., a corporation of New York
Filed Aug. 23, 1966, Ser. No. 574,358
59 Claims. (Cl. 38—78)

ABSTRACT OF THE DISCLOSURE

Component parts of an electric iron are provided with manually operable latching means so that the parts can be assembled and disassembled without the use of tools. At least three component parts are employed with the latching means preferably acting to hold the handle and sole plate components together. Components not directly latched together are held in place by interlocking with other components so that the latching together of other components holds them in place. A water reservoir component for example, is made to interfit mechanically with the handle component and is clamped in place by the sole plate when the sole plate and handle are latched together. A pump and spray nozzle component may be similarly interfitted with the handle and clamped in place by the sole plate component. A cord plug component interfitting with the handle preferably completes electrical connections to the heating element in the sole plate.

---

The present invention relates to electric irons and more particularly to irons which are composed of component parts which may be assembled and disassembled manually and without the use of tools.

In the prior art it has been a common complaint that the cost of repair of an electric iron frequently approaches or actually exceeds the purchase cost of a new iron. Most commonly the failure or damage requiring repair is of but one part representing only a small portion of the total value of the iron and the rest of the iron remains sound. However, as the result of the economic situation, irons in excellent condition except for one part have been totally discarded. For example, a heating element may be extremely difficult or impossible to repair in modern irons employing units cast into the sole plate so that failure of the heating element almost certainly means the discarding the entire iron. While the sole plate as a complete unit in this case would be replaced, the labor required in making repairs often amounts to more than the value of the salvaged parts so that it is not practical to salvage the old iron. Other parts may require less labor to replace but as a practical matter the labor for almost any repair is a substantial proportion of the value of a new iron. For this reason a broken handle, a ruptured water reservoir in a steam or spray iron, or a damaged pump or nozzle on a spray iron may either result in excessive cost of repair or, more likely, in repair not being undertaken and the iron either discarded or used with dissatisfaction by the user. The present invention overcomes the stated disadvantages of prior art irons and to an important degree makes it possible for irons to last a lifetime, replacing as necessary any of several components which become damaged or defective. Moreover, the present invention makes it possible to replace the various component parts using only the hands of the normal user, such as a housewife, and not skilled labor.

More specifically the present invention contemplates an electric iron comprising a plurality of component parts including at least handle and sole plate components. In a given case the sole plate component might include a sole plate and heating element only or, alternatively, might also include a steam generating chamber and steam passage to the ironing surface and/or a thermostatic control element for adjusting the temperature of the iron. The handle in a given case might be only a heat insulating grip structure for handling the iron during use or it might include the electric cord and connector, suitable controls for a steam iron valve, a pump structure, etc. In a preferred embodiment an iron in accordance with the invention may be subdivided into as many components as are practical as dictated by the problems of a given iron structure. Thus a separate reservoir for a steam, or steam and spray, iron is desirable as is a separate pump and nozzle structure for a spray iron. For other reasons covered by a separate patent application Ser. No. 519,863, filed Jan. 11, 1966, by Pierre L. Decrouez for Electric Iron and assigned to the assignee of the present invention, a separate and separable cord connector is desirable.

In order for the present invention to be practical the means of interconnection of the various component parts must be so simple that a housewife will have a minimum of difficulty in assembling those component parts. This assembly and disassembly in accordance with the present invention must be manually accomplished without the use of tools. Preferably latching means is provided which can be manually operated and which lock the assembled components together. In preferred embodiments the latching means acts to hold the handle to the sole plate, and, since the sole plate almost of necessity will be the most expensive single component, the latching means or most of it, is preferably provided on the sole plate component. Other component parts may be the water reservoir and a spray pump and nozzle combination.

With the structure subdivided into component parts which are easily assembled to and disassembled from one another without the use of tools, it is possible to make each component for only a fraction of the price of a complete iron. In accordance with the structure of the present invention should one part become damaged or inoperative for any reason the trouble can be diagnosed by the housewife herself, who can then disassemble the iron, discard the faulty component and substitute a new component of exactly the same size and shape into the iron as she correctly reassembles the iron. In this way all costly repair by skilled labor is avoided and the iron can truly last a lifetime replacing only defective components as the need arises.

The present invention finds embodiment in many possible forms. In a preferred form described below, certain of the features of structure themselves have novelty apart from the principal concept as will appear from the description.

For a better understanding of the present invention reference is made to the accompanying drawings in which:

FIG. 1 is a front elevational view of the preferred embodiment of the iron of the present invention;

FIG. 2 is a rear elevational view of the same iron;

FIG. 3 is a plan view from above of the iron of FIGS. 1 and 2;

FIG. 4 is a side elevational view of the iron of FIGS. 1–3;

FIG .5 is a plan view of the bottom of the iron of FIGS. 1–4;

FIG. 6 is a somewhat enlarged exploded view of the iron of FIGS. 1–5 showing the various components of the iron disassembled;

FIG. 7 is a perspective view from below of the handle component of the iron;

FIG. 8 is a perspective view from below of the spray pump component of the iron;

FIG. 9 is a perspective view from below of the water reservoir component of the iron;

FIG. 10 is a perspective view from above of the sole plate component of the iron including the heating element, the steam chamber and the thermostatic control;

FIG. 11 is a perspective view of the cord connector component of the iron;

FIG. 12 is a detail view partially in section showing the means of connection of the pump component to the handle and sole plate components;

FIG. 13 is a detail view partially in section showing the interconnection between the handle and the reservoir components;

FIG. 14 is a plan view of the sole plate component of the iron showing the connection pins from the handle in section and engaged in their sockets in the sole plate and the locking lever in its locking position;

FIG. 15 is a sectional view taken along line 15—15 of FIG. 14;

FIG. 16 is an enlarged partial sectional view taken along line 16—16 of FIG. 3;

FIG. 17 is an enlarged partial sectional view taken along line 17—17 of FIG. 6; and FIGS. 18 through 48 are schematic diagrams showing various possible combinations of components which can be made within the concept of this invention to provide an iron having easily assembled and disassembled components.

Referring first to FIGS. 1-6 it will be observed that the iron illustrated is a spray and steam iron. The assembly shown includes as components separable and interconnectable pieces which can be assembled and disassembled manually and correctly without the use of tools by an unskilled person. Disassembly facilitates cleaning and repairing of parts and permits the substitution of new parts for old defective parts without replacing the entire iron. The component parts of this particular iron are sole plane component 10, water reservoir component 40, handle component 50, cord connector component 70 and spray pump component 80. It will be appreciated immediately that the spray pump component will be omitted in a dry or steam iron. In such irons the parts would undoubtedly be redesigned so that it is apparent from this possibility that change in shape of components is possible within the scope of the invention. In fact, complete redesign of the relationship of components and their interconnections is anticipated for various reasons and such changes are within the scope of the present invention. Furthermore, components in addition to be being added and subtracted may be subdivided, such, for example, as making separate components of the sole plate and thermostatic switch. The structure shown in detail herein, therefore, is intended to be merely representative of the invention and many possible modifications of the broad combination of components as well as structural detail is contemplated within the scope of the invention.

The specific embodiments shown in the drawings has a number of advantages peculiar to the structure or structures shown which make it a preferred embodiment. Such fetures includes a cool handle, a cool water reservoir, large reservoir capacity and ease in assembly.

The handle and water reservoir are cooler in this preferred structure because they are elevated well above the sole plate structure. The handle component makes contact with the heated portion of the sole plate in only a few places and these are small areas represented by the ends of pins. The ends in actual contact with the heated sole plate if rounded further minimize conduction possibilities and making the pins long and thin of low conductivity material, further reduces this tendency. Contact between the thermostat housing and the handle is between non-conducting molded parts so that little heat is conducted in this manner. Between the handle and the sole plate is the water reservoir which acts as a baffle against radiation.

However, the water reservoir itself is cooler than any prior art water reservoir of integral flash boiler construction. The water reservoir is cooler because it is outside the sole plate cover normally enclosing it in prior art structures and is elevated above the sole plate cover by a distance sufficient to prevent radiation from ever causing boiling of the water in the reservoir and it is unique among steam irons in this respect. The only structure of the reservoir which touches the sole plate (and only the boiler cover thereof) is a non-conducting seal element of silicone rubber of like material that does not conduct heat back to the reservoir. Thus the handle and all structure which is adjacent a user's hand is cooler in size and more comfortable in use. The danger of burning one's knuckles on the sole plate cover is also eliminated and the reservoir by being located where it is, is not limited in size so that it can be made larger for longer use without refill. The thermoplastic materials of which the reservoir is made enable blow molding so that there are no seams to split and with relatively cool temperatures long life for the reservoir can usually be expected. Moreover the location of the water reservoir and the use of molded material make possible visual monitoring of water level through the translucent reservoir wall.

Assembly of the preferred iron also has positive advantages since by the construction illustrated the parts may be quickly and easily assembled. Designing components so that they could be easily assembled by unskilled persons involved solution of the substantial technical difficulties because completion of the electrical and flow connections and connecting linkages normally make assembly of an iron a difficult and time consuming task. Here the arrangement of parts has been contrived not only to make a solid sound mechanical connection but to additionally provide automatically all the electrical and fluid connections and mechanical linkage assemblies that usually take so much time. Moreover, all of this is done bearing in mind the possible ineptitude of unskilled persons assembling the iron and the differences in dimensions of components due to tolerances and changes in those directions due to wear so that when substitutions are made or as parts wear the structure will be as solid and reliable as the original structure.

Considering first the sole plate component 10, reference is made to FIG. 10 wherein this component is illustrated. The actual sole plate 11 is a cast conductive metallic element having a flat pressing surface 11a at which steam ports 12 from an integral steam chamber (not shown) terminate. These ports emit steam for steam ironing and the structure of the steam chamber and port system may be essentially like that shown in United States Patent No. 2,908,092 of Daniel E. Clapp and assigned to the assignee of the present application. The steam chamber is preferably cast integrally with the sole plate and provided with a suitable sheet metal cover on the order of that shown in Patent No. 2,908,092. The chamber is preferably of the flash boiler type which is fed water from a reservoir at a rate sufficiently slow to permit the heat of the sole plate to cause the water to immediately vaporize upon contact with the hot sole plate within the steam chamber. The cover therefore is provided with an opening to receive the water feed fitting from the reservoir. In FIG. 10 the steam chamber cover cannot be seen because sheet metal cover 13 covers essentially the entire top of the sole plate. Sheet metal cover 13 is supported above the top of the sole plate by suitable lugs at least one of which contains a threaded bore to receive screw 14 which holds the cover in place. The cover 13 has a downturned peripheral skirt around its periphery to close the space between it and the sole plate.

The heating element for the sole plate is preferably a suitable rod type unit cast into the sole plate 11 of the type generally shown and described in the copending United States patent application Ser. No. 455,902 filed May 14, 1965, for Electric Iron the invention of C. R. Turner, and assigned to the assignee of the present invention. The heating element preferably is of generally U-shaped form extending along the edges of the sole plate with the bight of the U broken to permit inclusion of a thermostatic switch of the type shown and described in United States Patent No. 2,880,531 of Raymond H. Houck and assigned to the assignee of the present invention. This thermostat is combined in the manner taught by the aforesaid United States application Ser. No. 455,902 and the ends of the heating element are terminated in terminals as taught by that disclosure. These terminals in the present instance are brought through terminal block 15 which surmounts the cover 13 and is fixed to the sole plate 11 as a permanent part of the sole plate component. The terminal block 15 is designed to permit the terminals 15a to protrude above the block. The structure of terminal block 15 as a whole is designed to accommodate cord connector 70 which provides sockets for the terminals 15a.

The thermostatic switch subassembly 20 may in the alternative be made a separate detachable unit with suitable detachable electrical and mechanical connections between it and the sole plate subassembly. Here however, sole plate and thermostat structure is unitary. The thermostatic unit previously described is housed within housing 21 except for temperature control lever 22 which extends generally forwardly above housing 21 and beneath sheet metal cover 23. The lever is terminated in finger piece 24 which is used in positioning the lever 22 to select sole plate ironing temperature. This is normally done by positioning the lever relative to calibration along the top of the housing 21. Cover 23 serves to protect the thermostat from damage or maladjustment in the course of assembly or disassembly of the iron components.

Other parts of the sole plate component will be described hereafter in connection with the means permitting the components to be connected together.

The water reservoir component for the first time is made a completely separable and totally visible structure in the assembled iron. This arrangement serves not only to make the component more readily disassembled and reassembled but also make it possible to continuously visually register the water level in the reservoir provided the body 41 of the reservoir is made of translucent or transparent material. A blow molded structure of polypropylene has proved very satisfactory for this component. This technique makes it possible to produce an integral structure having a metallic water feed valve 42 and a relatively large diameter soft silicone rubber water inlet tube 43 in the body of reservoir 41. The shape of the structure and the location of valve 42 and tube 43 is such as to facilitate combination with other components as explained below. In addition, a check valve 42a which aids in rapid filling but avoids spillover is permanently fixed to the reservoir body to extend through a wall thereof. It is highly desirable in order to avoid the need for gaskets that seal 42a surrounding valve 42 below the reservoir and inlet tube 43 be made of resilient material to effect sealing and prevent leaking between components. Only seal 42a contacts the cover of the steam chamber so that there is no heat conduction back to the reservoir through valve 42 (see FIG. 47).

FIG. 7 shows the handle component 50 which is preferably composed of rigid molded resinous material. The grip portion 51 of the handle provides a bridge between a rear leg 52 and a front leg stub 53 which together with the thermostat housing 21 provides the front leg of the iron. The rear leg is hollow to accommodate terminal block 15. The rear leg has cast into it a pair of parallel downwardly extending positioning pins 54 and a parallel downwardly extending locking pin 55. The front leg stub 53 also has cast into it a downwardly extending locking pin 56 parallel to and similar to pin 55. These pins function in the assembly of the iron described below.

The cord connector 70 electrically connects the cord 71 to terminals 15a which extend into sockets 72. The cord connector housing 73 is preferably a two piece rigid molded resinous structure which contains electrical contact structure made in accordance with the teaching of the previously mentioned United States patent application Ser. No. 519,863 to Pierre L. Decrouez and reference is made to that patent application for details of structure relating thereto. It will be apparent, however, that any other suitable cord connection may be employed or alternatively the cord and connector structure may be made integral with the handle component.

FIG. 8 shows the water pump component 80 which is assembled into the front leg stub of the handle and is preferably comprised largely of molded material. The pump 81 is preferably of a type shown in detail and described in the previously mentioned United States Patent No. 3,237,325, but may be of any other type suitable to the particular iron in which it is employed. The pump consists of a cylinder 82 having an axial bore in which reciprocates a plunger manually operated by finger piece 83 and which is supplied water through tube 84 which terminates in a filter element and which in the assembled iron extends downwardly from the pump cylinder into the water reservoir 41. In the assembled iron water is pumped up by the reciprocating action of the plunger and forced out nozzle 85. The pump component 80 also provides a funnel beneath the pump 81 and above skirt 86 which directs water into inlet tube extension 87 and thence into the inlet tube 43 of the reservoir in the assembled iron.

The five components functionally and broadly structurally described above are assembled simply and without the use of tools by the expedient of interfitting parts which by manual cooperation and at least one locking means so connected together to function as a spray and steam iron without coming apart in use. The manner of assembly can best be seen in FIG. 6 with occasional reference to FIGS. 7–11. With the exception of cord connector component 70, the components are assembled in a particular sequence predetermined by design. More specifically water pump component 80 and the front leg stub 53 of handle component 50 are first assembled with the finger piece guide 88 being received between wings 57 of the handle component 50. Wings 57, in turn, are snugly received within concavities 89 on each side of the structure and positioned laterally by hollow web 90 providing a portion of the water funnel. As pump component 80 is put into place a backwardly and upwardly extending tab is positioned behind an undercut shoulder 58 best seen in FIG. 12 by moving the pump component 80 upwardly as it is moved into contact with the handle component 50, and the respective components are designed to permit such movement. When assembled together to the casual observer the pump and handle assembly provide the appearance of an integral structure. Obviously much redesign of the structural appearance, necessitating modification of the cooperating structure is possible but such modification is not only an acknowledged possibility but an expected development as styles change. As such changes occur the cooperation of parts will have to be redesigned, but such redesign is well within the concept of the present invention.

The water reservoir component is next put in place relative to the assembly of the handle and pump components by inserting tube 84 into inlet tube 43 and pressing the reservoir upward. As best seen in FIG. 9 at its rear end the reservoir is provided with hollow flanking protrusions 44 which snugly embrace rear leg 52 of the handle and prevent lateral movement of the reservoir relative to the handle as well as enlarging the capacity of the reservoir. Between the protrusions the reservoir has recess 45 which leaves clearance for terminal block 15 and a recess 45a within recess 45 permitting the reservoir to pass locking pin 55. Except for recess 45a, the bottom of recess 45 is flat and provides a surface against which springs 58 on pedaments 59 act to urge the reservoir forward. At its front end, as seen in FIG. 9, the reservoir has a pair of vertically extending concave similar recesses 47 interrupting an otherwise flat end. One recess has a broken web 47a having a guide function to be described and the other has a web 47b designed to be urged by springs 58 against pin 56 in assembly as seen in FIG. 13 and having a shoulder which opposes the shoulder afforded by ring 56r on pin 56 to hold the reservoir vertically in place during assembly. Ring 56r has a conical bottom to facilitate passing web 47b over it as it is moved upward. In moving the reservoir 41 upward inlet tube 43 is moved against rigid feed tube extension 87 and the resilience of the elastomeric material such as rubber of the inlet tube 43 permits some yielding and effects the necessary sealing between the inlet tube extension 87 and the inlet tube 43 of the reservoir merely by the compression of the material of the inlet tube.

In assembling the reservoir to the handle various guide means not only cause the inlet tube 43 to properly align with inlet tube extension 87 but cause the valve 42 to assume its proper position, as seen in FIG. 47, relative to the actuator 61. Actuator 61 is connected by tie 60a through a vertical slot 62 in the front leg 53 of the handle to a steam-dry selector knob 60. This assembly rides loose in slot 62 until the valve structure 42 contacts it. The portion of the valve structure 42 which contacts actuator 61 is a plunger 42b which is slidably mounted within the tubular valve casing 42c. The portion of plunger 42b, which extends from above the casing 42c downwardly into the casing, broadens within the casing into a tubular portion which is snugly received by the casing. Valve stem 42d has a piston portion which is slidably mounted within the tubular portion of stem 42b to cause the valve stem 42d to seat against valve seat 42e, provided by a shoulder in the valve casing 42c and advantageously located at the bottom of the reservoir. Between valve stem 42d and the plunger 42b is a relatively stiffer spring 42f and between the valve stem 42d and the casing 42c is a relatively lighter spring 42g which yields before spring 42f does. Thus the action is first for the stem 42d to be seated upon compression of the lighter spring 42g as plunger 42 is moved downward. When spring 42g is fully compressed, however, spring 42f is able to compress to take up differences in clearances and tolerances and compensate for wear of the parts. Plunger 42b tends to contact the actuator 61 off-center and nearer that edge of the bottom remote from the slot 62 and cock the actuator so that in the lower position in which the valve is closed the actuator catches against shoulder 63 where it is held by the spring pressure on the plunger 42b until the actuator is released from the shoulder by knob 60. When the knob 60 is in the lower position, therefore, the valve is held closed and when the knob and actuator 61 are released from shoulder 63 the springs 42f and 42g tend to return the valve to open position and raise the knob to a position indicating open valve or steaming operation.

The valve 43a is a ball check valve as seen from FIG. 48 and in the horizontal position the reservoir assumes in ironing position the ball 43b seats on the top of tube 43c. When the iron is put on its heel rest so that the reservoir is vertical and the valve structure horizontal, the ball 43b moves away from the tube and therefore allows rapid exit of air in the reservoir as it is replaced by water in filling the iron. The cap 43d is provides check valve seal so that when water starts to flow out of the valve, the water carries the ball into seated position and prevents overflow. This simple arrangement, therefore, aids considerably in filling the water reservoir, yet prevents damage due to overflow. Since the reservoir is kept cool, there is no regurgitation through the inlet problem, as was experienced in the prior art.

Assembly of the combined pump, handle and reservoir components to the sole plate component is accomplished by inserting pins 54 through openings 16 in the cover 13 until their ends abut the sole plate 11. When the pins 54 bottom on the sole plate and the bottom of the front leg stub 53 bottoms on shoulder 28 and locating pin 53a molded as an integral part of the front leg stub 53 is snugly received in guide hole 28a to accurately locate the handle component relative to the sole plate and hence the reservoir relative to the sole plate. This feature for example assures that the valve seal is properly located relative to the steam chamber cover without the valve contacting the cover.

Pin 55 is received in tubular metal boss 17 and pin 56 in boss 24 forming part of the molded switch housing 21 which may be more readily seen in FIGS. 14 and 15. Each of pins 55 and 56 has a reduced diameter portion located to fall just beneath the cover 13 when the handle is in place in position on the sole plate. The reduced diameter portions of the pins provide upward facing shoulders 55a and 56a which are designed to act as part of the latching mechanism for connecting together the various components. The other part of the latching mechanism is a spring metal slide element 18 which is longitudinally slidable and movable by an operating lever 19 one way to engage and the other way to disengage shoulders 55a and 56a. Slide 18 is fixed to cover 13 by rivets 13b which ride in longitudinal slots 18a in slide 18 which permit its movement. The slide is arranged so that when in its forwardmost position the pins 55 and 56 enter openings large enough to accommodate the full diameter of the pin. When the handle is in position on the sole plate, the pins extend through holes in cover 13 and the reduced diameter portion of both pins is at slide level. The slide is then moved the other way and the widths of the respective openings, at the respective pins, narrows to a width smaller than the diameter of the pins except at the reduced diameter portions. Since the slide is somewhat thinner than the extent of the reduced diameter portions lengthwise along the pins, the shoulders between the full and reduced diameter portions embrace the slider. The slot accommodating pin 56 is a keyhole slot 18b, as best seen in FIG. 14. The slot accommodating pin 55 is an open ended slot 18c at the end of the slide which widens at the open end. In addition to narrowing, the portions of the slide in the region of slots 18b and 18c are bent to extend downward from the point at which each pin enters to the point at which it is locked in place. The slide is made of spring material so that the regions which engage the pins bear downwardly on shoulders 56a and 55a and urge positive seating of the components as well as providing means for maintaining a tight connection to the sole plate despite tolerate manufacturing variation and wear. Slide movement results as handle 19 is moved by finger piece 19a about pivot connection 13c by virtue of the interconnecting pivot 19b between the slide 18 and the handle 19. The slot 13d in the cover 13 permits such movement. As seen in FIGS. 3 and 4, the handle in locked position is out of the way beneath the iron with only handle 19a protruding just sufficiently to permit it to be grasped when the structure is to be disassembled. The handle carries a tab 19c. Due to the inherent resilience of the handle and its upward bias the tab is urged upwardly toward rear leg 52 and tends to rise into depression and lock there to prevent unintended release. Release can be accomplished by downward pressure on finger piece 19a as it is pulled away from the leg 52.

In assembled position, as seen in FIG. 12, tabs 92 (shown in FIG. 8) interlock with shoulders 25 (shown in FIG. 10) to prevent the downward and forward movement of the pump component 80 necessary to remove it from the handle component 50. Also when assembled, web 47a and recess 47 act with boss 26 to position the reservoir and hold it against lateral or vertical movement. Thus held the feed tube 42 is positioned to drip water to produce steam when the iron is in ironing position. When placed back on its heel rest, however, the end of feed tube 42 becomes the highest point in the reservoir and water cannot flow out for this reason.

Finally the cord connector 70 is positioned in the handle recess 60 and latch 61 is spring urged to overlie it and hold it in position against internal spring pressure tending to urge it out as described in the previously mentioned United States patent application Ser. No. 519,863. In this position cord connector housing 73 nests within the terminal block with the terminals 15a connected as described in said patent.

FIGS. 16 through 46 are representative of various alternative arrangements of component parts. Various possibilities of subdividing components have been mentioned above as have the possibilities of adding or omitting components. Even more likely is the possibility of rearrangement of the component parts or interconnection or attachment in modified manner to the same or different components. These diagrams show in block form some of the many possibilities of interconnection and attachment of parts. The blocks are labeled with the names or symbols of the names of components and the lines interconnecting the boxes or intersecting other lines represent alternative possibilities of connection together of components within the scope of the present invention. These diagrams suggest that in addition to the structure shown in FIGS. 1 through 15 many other possible combinations are also possible and will occur to those skilled in the art. All such combinations and others within the scope of the claims are intended to be within the scope of the present invention.

I claim:

1. An electric iron comprising a plurality of component parts, including handle and sole plate components and at least another component other than a cord connector interfitting with the handle component, said handle and sole plate components having interconnecting means permitting assembly and disassembly of the component parts manually and without use of tools and including latching means which holds together at least two interfitting parts and prevents removal of the third component.

2. An electric iron comprising a plurality of component parts, including handle and sole plate components, the sole plate including an embedded heater element, and at least one other component, at least two of said components having interconnecting means permitting assembly and disassembly of component parts manually and without use of tools and including latching means which holds together said at least two component parts and is so arranged that when the latching means is effective the third component part is interlocked to the component parts held together by the latching means.

3. An electric iron comprising a plurality of component parts, including handle and sole plate components, the sole plate including an embedded heater element, and at least one other component, said handle and sole plate components having interconnecting means permitting assembly and disassembly of the component parts manually and without use of tools and including latching means which hold together interfitting parts of the handle and sole plate components and said other component part which is so arranged that, when the latching means is effective, said other part is interlocked with at least two other components.

4. The electric iron of claim 3 in which a component part so-interlocked is the water reservoir component.

5. The electric iron of claim 4 in which the water reservoir component is interlocked into the handle and sole plate components.

6. The electric iron of claim 3 in which a component part so-interlocked is the water spray component.

7. The electric iron of claim 6 in which the water spray component is interlocked with the handle and sole plate components.

8. The electric iron of claim 3 in which water reservoir and water spray components are both so-interlocked.

9. The electric iron of claim 8 in which the water reservoir and water spray components are both interlocked with the handle and sole plate components and so positioned when interlocked to cooperate with one another.

10. An electric iron comprising a plurality of component parts separable from one another manually and without use of tools, including at least handle and sole plate components, said sole plate conponent including an integral heater element and at least one other component at least one of which has elements received by the sole plate component and latching means on the sole plate component receiving said elements for holding said elements in place wherein one component part other than those held together by the latching means is so arranged that when the latching means is effective said one component part is interlocked to the component parts held together by the latching means.

11. The electric iron of claim 3 in which the elements on at least one of the components includes at least one pin to be received within a hole in the other component and the latching means engages at least one of said pins.

12. The electric iron of claim 11 in which said at least one of the pins engaged is provided with reduced diameter portions and the latching means consists of a movable latch element transverse to the pins and having a position in which at least one pin is able to pass the element and movable from this position to one in which portions of the movable latch element closely embrace the reduced diameter portions of the pin and prevents its removal.

13. The electric iron of claim 12 in which the movable latch element is a slide which is provided with a slot to receive the reduced diameter portion of the said at least one of the pins engaged and said slide is oriented to be movable in the direction of the slot to a position in which the slot opens to permit said pin to be removed from the movable latch element.

14. The electric iron of claim 13 in which the handle component is provided with at least two pins and the sole plate component is provided with a slide which is elongated and provided with longitudinally extending slots and is arranged to be moved longitudinally by a pivoted lever element.

15. The electric iron of claim 13 in which the sole plate component includes a cover plate affixed to the sole plate element and in which the slide is slidably attached beneath the cover plate to slide relative to the cover plate and the pivoted lever element is pivotally supported on the outside of the cover plate and pivotally connected to the slide through a suitable slot permitting movement of the slide.

16. An electric iron comprising a plurality of component parts including at least handle, sole plate and water reservoir components having interconnecting means permitting assembly and disassembly of the component parts manually and without use of tools wherein the reservoir component is clamped in place between the handle and the sole plate components and latching means is provided to hold said sole plate and handle together in said clamping position.

17. The electric iron of claim 16 in which the water reservoir has a tubular portion extending toward the sole plate providing a water feed tube to meter the flow of water into a steam chamber integral with the sole plate, including an outer non-conducting portion, said water feed tube providing a seal to the steam chamber through said non-conducting portion.

18. The electric iron of claim 16 in which the water reservoir has a tubular portion extending toward the water inlet tube of the reservoir providing an inlet tube extension and sealing against the inlet tube by virtue of the resilience of the inlet tube.

19. The electric iron of claim 16 in which the reservoir is formed of a blow molded resinous material.

20. The electric iron of claim 19 in which the reservoir is translucent so that the level of water therein may be inspected.

21. An electric iron comprising a plurality of component parts including at least handle, sole plate and water reservoir components having interconnecting means permitting assembly and disassembly of the component parts manually and without use of tools wherein the handle component has front and rear leg portions and the reservoir is shaped to be received between the leg portions, resilient means between the reservoir and at least one of the legs and a shoulder fixed to the other leg and cooperating with a portion of the reservoir so that by the urging of the resilient means the reservoir is held in place with respect to the leg as the handle component is assembled to and disassembled from the sole plate component.

22. The electric iron of claim 21 in which the reservoir component is provided with lateral extensions which when assembled with the handle component embrace a portion of a leg.

23. The electric iron of claim 21 in which the cooperating shoulders on the reservoir act together with lateral guide means to position the reservoir in position relative to the handle so that its water inlet opening is directly beneath the water funnel which extends through the handle and bears against the funnel opening when the reservoir is in position on the handle so that slight additional pressure due to resilience supplied in at least one of the funnel and water inlet combination will produce sealing between the reservoir water inlet and the funnel.

24. The electric iron of claim 21 in which the water feed opening from the reservoir to the sole plate lies over the water inlet in the sole plate when the iron is assembled with the reservoir in operative position relative to the sole plate and such that a resilient tube of insulating material between the reservoir and the sole plate seals the flow path between the reservoir and the water inlet in the sole plate.

25. The electric iron of claim 21 in which the water feed opening from the reservoir lies over the water inlet opening in the sole plate when the handle with the reservoir in place is assembled to the sole plate and such that the resilient tube of insulating material employed between the reservoir water feed opening and the water inlet opening of the sole plate seals the water flow path between the reservoir and sole plate upon connection of the handle to the sole plate.

26. The electric iron of claim 21 in which the handle and the reservoir are provided with indexing means for positioning of the reservoir relative to the handle so that the valve selector on the handle cooperates with and actuates a valve in the reservoir.

27. The electric iron of claim 26 in which the reservoir is provided with spring means normally urging the valve open and the plunger up toward the handle that the handle may be provided with a simple valve position selector extending through a portion of the handle having a knob on one side of the handle and an actuator for contacting the valve plunger on the other side of the handle positioned so that said actuator will strike the plunger, said actuator comprising part of a latch which has a shoulder at an upper edge designed to cooperate with a small shoulder on the internal surface of the handle providing a stop limiting upward movement of the valve operator and against which stop the shoulder of the actuator is caused to bear by the spring urged valve plunger which acts to tilt the slide actuator to cause the shoulder to engage the stop, when the slide approaches its lowermost position, the stop shoulder being sufficiently small that pressure on the knob tending to straighten the element and move it away from the shoulder will cause the actuator to ride over the stop shoulder.

28. The electric iron of claim 27 in which the valve element is an assembly which has additional spring means between the plunger and the valve which permits the plunger to continue to move once the valve has been seated without damaging the valve or valve seat.

29. An electric iron comprising a plurality of components including sole plate, reservoir, handle and water spray components, said components having interlocking parts permitting assembly and disassembly of the component parts manually and without use of tools, wherein the water spray component is maintained in place by cooperation with at least two other components and is provided with an inlet tube extension positioned to cooperate with the reservoir inlet tube and seal therewith.

30. The electric iron of claim 29 in which the spray component is made to interfit with the handle component and is provided with means which limits movement to one direction and in which the spray component interfits with a thermostat housing on the sole plate component to limit movement to a direction different from the direction permitted by the handle so that when the structure has the sole plate fixed to the handle component no movement of the spray component is possible.

31. The electric iron of claim 29 in which those components of the combination required for safe operation constitute necessary parts to the interlocking and interlocking cannot be accomplished with any such part omitted.

32. The electric iron of claim 31 in which the various components have such contours that they can be assembled together with the other components in only one possible way in order to avoid errors in assembly.

33. A sole plate component for an electric iron comprising a cast sole plate portion including a heating element, a cover secured to said sole plate provided with openings to receive pins from another component to attach that component to the sole plate component and latching means manually movable between a position permitting entry of the pins and a position clamping the pins in place.

34. The sole plate component of claim 33 in which the heating element is terminated in terminals extending out of the sole plate through a terminal block positioned to be received in an opening in a handle component and in turn to cooperate with a cord connector component fixed to the handle component.

35. The sole plate component of claim 33 in which the latching means is a slide attached beneath the cover having limited movement relative to the cover and having at least one slot extending in the direction of movement of the slide and of such width as to contain a reduced diameter portion of a pin in one position and to permit passage of the full diameter of the pin in another position of the slide.

36. The sole plate component of claim 35 in which the slide means is moved by a lever pivotally attached to the cover and to the slide through an arcuate opening in the cover.

37. In combination with sole plate and handle components for an electric iron, a reservoir component for cooperation with said handle component comprising a hollow one piece tank of resinous material having dimensions of width and length in proportion to the electric iron component with which it is to be used, the width corresponding approximately to the width of the sole plate and the length being sufficiently shorter to fit largely within the confines of the separate handle component and the thickness being less than one-half the width dimension, said reservoir component having a water inlet tube opening into its top and a water feed tube opening out of its bottom.

38. The reservoir component of claim 37 in which the water feed tube opening is positioned at the front end of the reservoir tank so that when the iron is upended and placed on a heel rest forming part of the rear leg of the handle water will not flow out of the reservoir.

39. The reservoir component of claim 37 in which the rear of the reservoir tank is provided with extensions which embrace the rear leg of the handle component to aid in holding the reservoir in place, said extensions being hollow portions of the reservoir.

40. The reservoir component of claim 37 in which the reservoir tank is a thin walled blow molded structure.

41. The reservoir component of claim 37 in which the reservoir tank is translucent so that water level in the tank may be readily inspected.

42. The electric iron of claim 37 in which the water reservoir extends laterally a distance substantially the width of the sole plate thereby to provide a heat barrier to insulate the hand of the user from heat radiated from the sole plate.

43. The reservoir component of claim 37 in which the valve is part of an assembly, including the valve and the valve seat, whihc is provided with a plunger adapted to cooperate with an actuator on the handle to remove the plunger, comprising tubular means extending at least a substantial part of the way through the reservoir and terminating in a valve seat at or below the bottom of the reservoir, a valve element having a portion sliding within the tube to a position in which it seats on the valve seat to close the valve, first resilient means between the tubular means and the valve element urging the valve away from the valve seat, a valve actuator having a portion slidable within the tube, second resilient means between the valve actuator and the valve means less easily compressed than the first resilient means.

44. The structure of claim 43 in which the tubular means is cylindrical in form and has at least one opening inside the reservoir toward the bottom to permit the inflow of water, the resilient means are the actuator and the valve each comprising in part a piston sliding within the cylinder.

45. A handle component for an electric iron which has components which may be manually assembled and disassembled without the use of tools comprising a rigid resinous structure having front and rear leg portions and a bridging grip portion, each of said legs carrying at least one pin element arranged to be received by and for interconnection with another component of the iron and surfaces on said leg portions of said handle component interfitting with corresponding surfaces on other components in such a manner as to prevent the handle from being assembled in any way but the proper way.

46. The handle component of claim 45 in which there are at least two parallel locking pins respectively located in the front and rear legs of the handle which are positioned to cooperate with holes and locking structure in the sole plate.

47. In combination with sole plate and handle components and a reservoir a water spray nozzle and pump component for an electric spray iron consisting of a pump element having means to extend into a reservoir, a pump cylinder, a manually operated plunger within the cylinder and a spray nozzle and parts on the nozzle and pump component to interlock with interfitting parts on a handle component and on a sole plate component to maintain it in place relative to the handle when assembled with the sole plate, said combination permitting assembly and disassembly of the component parts manually and without the use of tools.

48. The water spray nozzle component of claim 47 in which the component also has connection means to cooperate with a sole plate component such that the two connection means are effective to lock the water spray nozzle component in place when the handle and sole plate components are locked together.

49. The water spray nozzle component of claim 47 in which a water fill funnel is included as part of the component and provides a water feed tube extension which is positioned to seal against the water feed tube of the reservoir.

50. An electric iron comprising a plurality of component parts including at least a handle, sole plate and water reservoir components suitably arranged and interconnected wherein the reservoir is composed of resinous material, is separate from but supported at least in part by the handle, is uncovered and open to the air and is spaced from the sole plate thereby providing air insulation of the reservoir and its contents from the sole plate and wherein connection between the reservoir and the sole plate is made such that heat insulating materials are interposed between the reservoir and the sole plate to prevent heat conduction from the sole plate to the reservoir.

51. An electric iron comprising a sole plate including resistance heating means having terminals at a rear end of said sole plate, a shallow cover for the top of the sole plate enclosing the resistance heating means fixed to the sole plate, a handle having front and rear legs, latch means to releasably attach the handle to the sole plate, and a reservoir supported on said handle between said legs and latched in place by said latch means, said reservoir being spaced above said cover for heat insulation and having heat insulating water feed means from the reservoir to said sole plate, and water inlet means to the reservoir.

52. The electric iron of claim 51 in which said cover is substantially shallower than the total thickness of the water reservoir.

53. The electric iron of claim 51 in which said sole plate has superstructure extending above said cover which superstructure cooperates with at least one leg of the handle.

54. The electric iron of claim 53 in which the said superstructure includes a terminal block for terminals of the resistance heater in the sole plate and the rear leg of the handle cooperates with said terminal block to provide means for releasably receiving a cord coupling member and connecting the cord thereof to said terminals.

55. The electric iron of claim 53 in which the said superstructure includes a thermostat housing having means thereon cooperating with means on the handle for property locating the handle in relation to the sole plate.

56. The electric iron of claim 55 in which the said thermostat housing is precision located on the sole plate and in precise position to cause the handle and reservoir elements when indexed therewith to locate their water connection accurately with respect to the sole plate.

57. The method of providing an electric iron of a type having handle, sole plate and reservoir components with a quick disconnect feature for quick disassembly, cleaning repair, and the like, comprising the steps of
providing the reservoir with sealing means to seal to a handle water fill recepacle in the handle and to seal to a boiler chamber opening in the sole plate,
providing the reservoir with means interfitting with the handle whereby the reservoir may be supported in place in the handle,
providing the handle and the sole plate with latch means to connect the handle and sole plate together and clamp the reservoir between them with the sealing means in proper position,
assembling the reservoir to the handle, and
assembling the handle to the sole plate so that the latch means is effective whereby the sealing means complete their effective seals.

58. The method of providing an electric iron of a type having handle, sole plate and spray nozzle and pump components and a water reservoir with a quick disconnect feature for quick disassembly, cleaning, repair and the like, comprising the steps of
providing the spray nozzle and pump component with a supply line extending into the reservoir when assembled and with surfaces contiguous to adjacent component parts which interfit with surfaces of those parts to hold the spray nozzle and pump component in place, assembling the spray nozzle and pump components to one of the interfitting components, and assembling said at least two components adjacent to the spray nozzle and pump component which retain said spray nozzle and pump component in place on the iron and latching together said at least two components to hold the spray nozzle and pump component in place.

59. The method of claim 58 further comprising providing a separate water reservoir component with surfaces contiguous to adjacent components which interfit with surfaces of those parts to hold the spray nozzle and pump component in place, and providing at least two other components adjacent the reservoir component which retain said reservoir component in place on the iron when said at least two components are latched together.

References Cited

UNITED STATES PATENTS

| | | | |
|---|---|---|---|
| 1,073,806 | 9/1913 | Lamb et al. | 38—92 |
| 2,763,075 | 9/1956 | Vance. | |
| 2,765,550 | 10/1956 | De Angelis | 38—92 |
| 2,786,287 | 3/1957 | Swann. | |
| 3,104,482 | 9/1963 | Jepson. | |
| 3,175,316 | 3/1965 | Foster et al. | |
| 3,183,611 | 5/1965 | Swenson. | |

PATRICK D. LAWSON, *Primary Examiner.*

UNITED STATES PATENT OFFICE
CERTIFICATE OF CORRECTION

Patent No. 3,413,741  December 3, 1968

Walter M. Schwartz, Jr., et al.

It is certified that error appears in the above identified patent and that said Letters Patent are hereby corrected as shown below:

Column 3, lines 20 to 23, cancel "FIG. 16 is an enlarged partial sectional view taken along line 16-16 of FIG. 3; FIG. 17 is an enlarged partial sectional view taken along line 17-17 of FIG. 6; and"; line 24, "18 through 48" should read -- 16 through 46 --; after line 28, insert the following paragraphs:

FIG. 47 is an enlarged partial sectional view taken alo line 47-47 of FIG. 3, and FIG. 48 is an enlarged partial sectional view taken along line 48-48 of FIG. 6.

line 61, "fetures" should read -- features --. Column 4, line 11, "of" should read -- or --; line 13, after "cooler" cancel "in size"; line 40, "directions" should read -- dimensions --. Column 7, line 3, "pedaments" should read -- pediments --; line 67, after "43d" cancel "is". Column 14, line 54, "recepacle" should read -- receptacle --.

Signed and sealed this 24th day of March 1970.

(SEAL)
Attest:

EDWARD M. FLETCHER, JR.  
Attesting Officer

WILLIAM E. SCHUYLER, JR.  
Commissioner of Patents